W. N. ALLAN.
AUTOMOBILE HEADLIGHT.
APPLICATION FILED JUNE 12, 1914.
1,146,914.
Patented July 20, 1915.
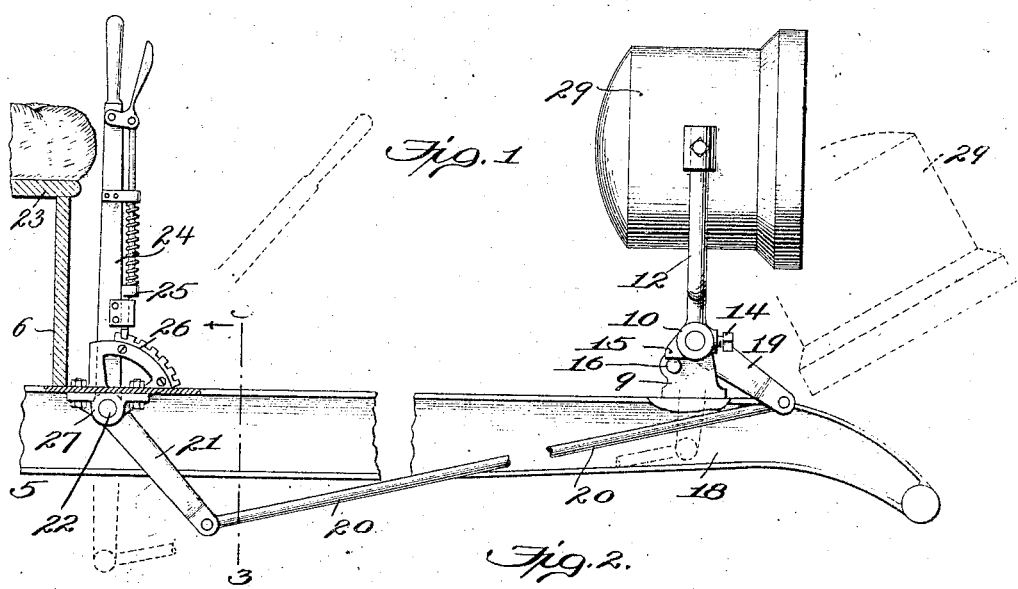
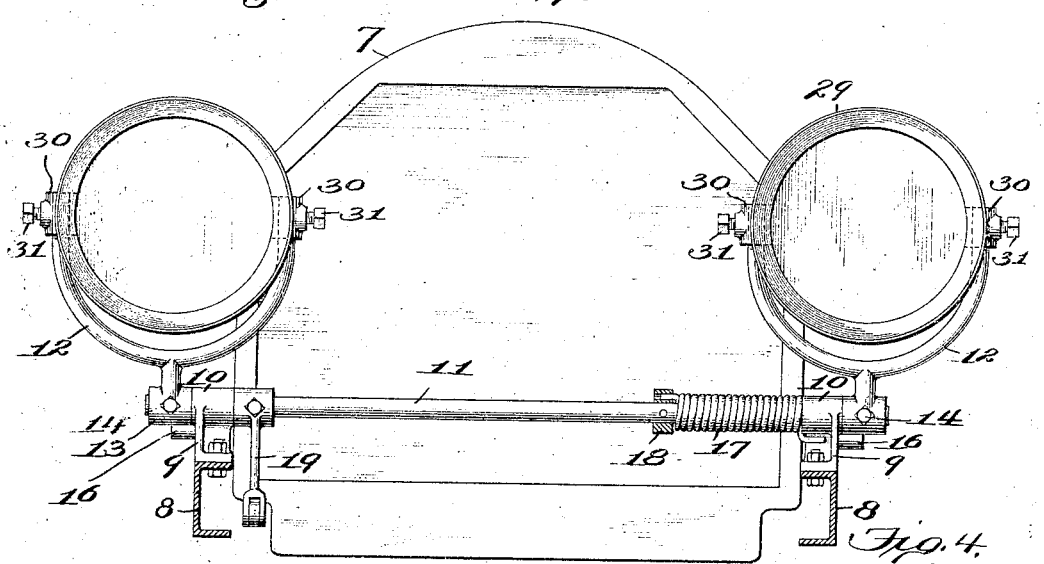
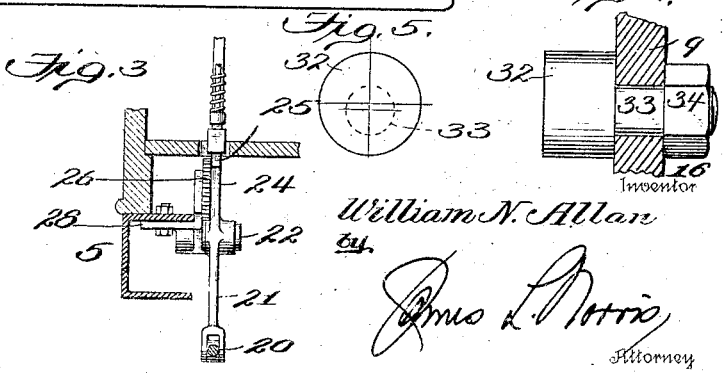

UNITED STATES PATENT OFFICE.

WILLIAM N. ALLAN, OF SAN ANTONIO, TEXAS.

AUTOMOBILE-HEADLIGHT.

1,146,914.  Specification of Letters Patent.  Patented July 20, 1915.

Application filed June 12, 1914. Serial No. 844,756.

*To all whom it may concern:*

Be it known that I, WILLIAM N. ALLAN, a citizen of the United States, residing at San Antonio, in the county of Bexar and State of Texas, have invented new and useful Improvements in Automobile-Headlights, of which the following is a specification.

This invention relates to headlights or illuminating means for an automobile or other vehicle, and the primary object of the invention is to provide simplified means for projecting or casting a light downwardly at an angle in advance of the front wheels of an automobile or other vehicle from a normal forwardly projected disposition of the light, and to maintain the light in this angular position as long as desired without requiring continuous manual attention and retention, and thereby relieve the front of an automobile or other vehicle of the confusing glare of a light which is usually projected longitudinally or straight away in advance of an automobile or vehicle without diminishing or modifying the full reflecting or illuminating capacity of the lighting means or headlight, and at the same time practically serve in aiding proper steering movements of the automobile or vehicle, and also to provide for ready restoration of the light to normal position.

In applying attachments of all descriptions to automobiles and mechanism generally, standardized features of construction must be invariably considered to avoid material reorganization or change of fixed structural parts when adapting improved attachments thereto. The present invention has in view the application of the improved means in connection with the usual form of headlight yokes or light supports of different types, so that the adaptation may be effected without modifying the yokes or supports in any of the essentials and thereby permit attachment of the improved means to yokes or supports of complete automobiles or vehicles or those now in use by a very simple operation.

The present headlight or illuminating device operating means constitutes an improvement of that disclosed by my allowed application Serial No. 789,299, filed September 11, 1913, and consists of the construction and arrangement of the several parts which will be hereinafter more fully described and claimed in preferred form.

In the drawing: Figure 1 is a broken sectional side elevation of a portion of an automobile showing the improved headlight attachment applied thereto. Fig. 2 is a front sectional elevation of an automobile illustrating the hood and showing the improved headlight operating means. Fig. 3 is a detail transverse section taken in the plane of the line 3—3, Fig. 1. Figs. 4 and 5 are detail views of a part of the stop means for the headlights when the latter are elevated in normal position.

The numeral 5 designates the chassis, 6 the body, and 7 the hood of an automobile or like vehicle, which will be mounted on running gear of any suitable type. The parts of the automobile or other like vehicle shown in the drawing are of the usual form and no modification of the general structure of automobiles or other analogous vehicles is required to adapt the improved attachment thereto. On the forward extremities of the side members 8 of the chassis, brackets 9 are secured, one on each, and these brackets are mainly similar to those ordinarily employed for supporting the headlights or forward lamps, but in the present instance are provided with upper bearings 10 in which a transversely extending rock-shaft or rocking rod 11 is mounted in advance of the front extremity of the hood 7, as shown by Fig. 2. Headlight or lamp yokes 12 are secured to the opposite extremities of the rock-shaft or rod 11 outside of the upper bearings 10 of the brackets 9, the said yokes 12 in the present instance having lower sleeves 13 which are slipped over the opposite ends of the rock-shaft or rod 11, and secured against movement on the latter by set-screws or analogous devices 14. The sleeves 13 of the yokes 12 are each formed with a shoulder or stop 15 which is adapted to engage a pin or projection 16 extending outwardly from the bracket 9 so as to hold each yoke normally in upright or perpendicular position and prevent the yokes from tilting rearwardly or having the least loose movement when in upright position. The rock-shaft or rod 11 is moved against the resistance of a spring 17 which is coiled loosely around a portion of the same and has one end bearing against the outer side of the adjacent bracket 9 and the opposite end secured to a collar 18 which is held in fixed position on the shaft or rod 11, as clearly shown by Fig. 2. A crank arm 19 is also secured to one extremity of the shaft or rod 11, and to the lower end of this crank arm a connecting rod 20 is attached and runs rearwardly to the depending end of a crank arm 21 of a rock-shaft 22 mounted in suitable bearings at one side of the machine or in connection with one of the side members 8 of the chassis adjacent to the seat 23 of the chauffeur or driver. The rock-shaft 22 also has a shifting lever 24 connected thereto and projecting upwardly adjacent to the seat 23 and is provided with the usual form of spring dog 25 to engage a toothed segment 26, the lever 24 and the rock-shaft 22 together with the crank arm 21 being arranged relatively to the chassis 5 and the floor of the automobile adjacent to the seat of the driver or chauffeur, as clearly shown by Fig. 3. It is preferred that the bearing 27 for the rock-shaft 22 be held by a bracket 28, as shown by Fig. 3, said bracket also having a portion thereof serving as a support for the toothed segment 26.

The usual form of headlights or lamps 29 are mounted in connection with the yokes 12 through the medium of sockets 30 having set-screws 31 to engage the upper terminals of the yoke arms, and the spring 17 is set primarily to operate to bring the yokes 12 and the headlights or lamps 29 carried thereby automatically into upright position after adjustment or when the rock-shaft 11 is released, and the said spring 17 is also of such resistance as to prevent loose action or operation of the yokes 12 and headlights 29 or to overcome any tendency of said yokes and headlights to move forwardly and downwardly when such adjustment is undesirable. The spring 17 will also overcome any tendency to undue vibration or displacement of the yokes 12 and headlights 29, and as hereinbefore noted the projections or shoulders 15 normally engaging the stops or pins 16 will obstruct rearward movement of the yokes 12 and headlights or lamps 29 beyond a predetermined normal position. The pin or projection 16 comprises a head 32 having an eccentric stem 33 with a screw-threaded extremity engaged by a nut 34. The purpose of this form of stop is to obtain proper adjustment of the headlights and keep the latter in a normal vertical position when raised. To correct or modify the adjustment when necessary, the nut 34 is loosened and the pin or projection 16 is turned to throw the head 32 around so as to give it a greater elevation, and conversely the head 32 may be turned in the opposite direction to lower it when the headlights rise to an abnormal forward inclination. After the pin or projection has been adjusted, the nut 34 is tightened to secure the pin against accidental movement.

To adjust the yokes 12 and the headlights or lamps 29 the chauffeur or driver grasps the upper portion of the lever 24 and releases the dog 25 from its engaging position relatively to the toothed segment 26 and then pushes forwardly on the said lever 24, which operates the rock-shaft 22 to swing the crank-arm 25 downwardly and rearwardly, as shown by dotted lines in Fig. 1. This movement of the crank-arm 25 draws the connecting rod 20 rearwardly in the same direction and pulls downwardly on the forward crank arm 19 against the resistance of the spring 17, and by this means the rock-shaft or rod 11 is moved forwardly in its bearings and the yokes 12 and headlights or lamps 29 are simultaneously and equally thrown forwardly at a downward angle of inclination so as to cause the light rays to be cast or projected on the roadway in advance of the forward extremity of the automobile or other vehicle and relieve the front of the automobile of a longitudinally projected light or glare without in the least interfering with the illumination of the roadway so that the driver or chauffeur may have full view of the roadway to assist in steering or guiding the machine as a whole. The yokes 12 and headlights or lamps 29 may be adjusted at any downward angle desired and the adjustment maintained by permitting the dog 25 to engage between the teeth of the segment 26 without requiring a continual manual retention of the operating mechanism by the chauffeur or driver. When the rock-shaft 11 is operated to throw the yokes 12 and headlights or lamps 29 forwardly at an angle to bring the headlights at a downward angle of projection as shown by dotted lines in Fig. 1, the spring 17 is wound or contracted relatively to the shaft or rod 11, and when it is desired to release or restore the yokes 12 and headlights 29 to upright position the shifting lever 24 is disconnected from the toothed segment 26 and the spring 17 then acts to automatically reset the yokes and headlights or to raise the latter until the projections or shoulders 15 engage and rest upon the stops or pins 16. It will be seen in the adjustment of the yokes and headlights that the luminosity or reflecting capacity of the headlights is not in the least modified and at any moment desired or found necessary during the travel of the automobile or other vehicle the headlights may be permitted to quickly resume their normal position and project the rays of light longitudinally or straight away in advance of the machine.

By means of the attachment automobile headlights or searchlights may be readily adjusted so as to relieve the front of the machine of the brilliant and ofttimes confusing projected light which is so blinding to persons in the path of the vehicle, and the attachment permits a quick compliance with the regulations of certain municipalities wherein it is required that automobile drivers modifying the intensity of their headlights or searchlights in passing through said municipalities, the improved attachment avoiding the necessity of modifying the normal intensity of the light and at the same time overcoming any confusion, so far as pedestrians are concerned, that usually arises from a straight-away projected light within the small confines of traffic-crowded thoroughfares of municipalities.

The improved attachment may be readily applied to any form of automobile frame now in use without materially modifying or changing the standardized organization of automobiles as now generally constructed, and in view of the simplicity of the parts of the attachment the cost of application thereof is reduced to a minimum with material advantages incident to the operation thereof, as hereinbefore noted.

It will be seen that the chauffeur or driver of the automobile or vehicle is not required to get out or alight from the automobile or vehicle in order to adjust the headlights, the operation of the latter being controlled solely from within the machine through the medium of the shifting lever 24. It will also be understood that in applying the attachment to various types of automobiles, changes in the proportions, dimensions and minor details may be adopted at will within the scope of the appended claims.

What is claimed is:

1. The combination with an automobile, of lamps and yokes connected thereto, a rock shaft having the lower portions of the yokes directly mounted on the opposite extremities thereof and held against lateral movement, the lamps and yokes being disposed over and directly above the rock shaft, the yokes being rigid between the lamps and their points in engagement with the rock shaft and prevented from having pivotal movement relatively to the said shaft, means for moving the rock shaft to simultaneously throw the lamps and their yokes at a forward and downward angle of inclination, and means engaging the rock shaft for automatically turning the lamps and yokes to normal upright position when the first named means is released.

2. The combination with lamps, of yokes provided with lower terminating horizontal sleeves rigidly connected thereto, a rock shaft on the ends of which the sleeves of the yokes are fixed, the yokes and lamps being prevented from having a pivotal movement relatively to the rock shaft, the lamps and yokes having movement solely in a forward and downwardly inclined and upward direction and obstructed against lateral movement in either direction, and means for operating the rock shaft for causing the lamps and their yokes to unitedly move forwardly and downwardly at the same angle of inclination.

3. The combination with lamps, of rigid yokes connected thereto and having lower terminal rigid attaching means, a transversely extending rigid connecting means to the ends of which the said attaching means of the yokes are fixed, mechanism for operating said connecting means to simultaneously throw the head lights and yokes at a forward and downward angle of inclination by direct operation of the supporting yokes and lamps and said connecting means, said mechanism being in part attached to the connecting means between the points of engagement of the yokes therewith, and means for restoring the lamps and yokes to normal upright position when the mechanism for operating the connecting means is released.

4. The combination with lamps, of yokes therefor having lower terminal attaching means rigidly connected to the ends thereof, a transversely extending rock shaft on which the attaching means are fixed, the yokes being over and directly above the rock shaft, a non-rotatable pull-rod connected to the rock shaft between the points of attachment of the yokes thereto, lever and shaft mechanism for operating the pull-rod, and means for restoring the lamps and yokes to normal upright position when the pull-rod and lever and shaft mechanism are released from a pulling position.

5. The combination with the usual lamps, of yokes connected thereto and having lower rigid attaching devices, a rock shaft to which the said attaching devices and yokes are fixed, the rock shaft having suitable bearing devices, stop means in part carried by the attaching devices of the yokes and by the bearing means for the rock shaft to prevent the yokes and lamps from tilting backwardly beyond a normal upright position, a non-rotatable rod connected to the rock shaft for simultaneously tilting the lamps forwardly and downwardly at an angle of inclination, mechanism for operating the said rod, and means for restoring the rock shaft, yokes and lamps to normal upright position when the pull-rod is released.

6. The combination with the usual lamps or headlights of an automobile, of yokes connected thereto and having lower rigid attaching means, a rock shaft provided with suitable bearings, the attaching devices of the yokes being mounted on the opposite extremities of the rock shaft outside of the bearing means and with the lamps prevented from having lateral movement or rotation in a horizontal plane, the yokes being disposed over and directly above the rock shaft, mechanism connected to the rock shaft for simultaneously operating the yokes and lamps, and means for automatically restoring the rock shaft, yokes and lamps to normal upright position when the said mechanism is released.

7. The combination with headlights and supports therefor fixed against rotation in a horizontal plane, of mechanism exclusively connected to the yokes below the headlights for throwing the headlights and supports forwardly and downwardly at an inclination from an upright position, and means for causing the headlights and supports to always assume a normal upright position consisting of adjustable stop projections and coöperating shoulder means on the supports.

8. The combination with headlights and supports therefor fixed against rotation in a horizontal plane, of mechanism for throwing the headlights and supports forwardly and downwardly at an inclination from an upright position, means for automatically elevating the headlights and supports to normal upright position when released, and means for checking the movement of the headlights and supports when they rise to an upright position and consisting of adjustable stop projections and coöperating shoulder means on the supports.

9. The combination with headlights and supports therefor, of mechanism for throwing the headlights forwardly and downwardly at an angle of inclination, and means for causing the headlights to always assume a normal upright position consisting of eccentrically adjustable headed pins and coöperating shoulder means on the supports.

10. The combination with lamps or headlights having rigid supporting yokes, of mechanism for throwing the lamps and yokes forwardly and downwardly from an upright position and including a rock shaft on which the yokes are fixed and held against lateral movement, bearing means for the rock shaft, stop devices adjustably mounted in portions of the bearing means and provided with eccentric heads, the portions of the yokes fixed to the rock shaft having projecting shoulders to engage the said eccentric heads for maintaining the lamps in normal upright position, and means for restoring the lamps and yokes to normal upright position when said mechanism is released.

11. The combination with lamps, of yokes therefor having lower attaching means rigidly connected thereto, a transversely extending rock shaft on which the attaching means of the yokes are fixed, the yokes being disposed over and above the rock shaft and prevented from having pivotal action relatively to the rock shaft, and operating means for the yokes and lamps all located below the latter and directly connected to the rock shaft between the points of engagement of the attaching means of the yokes therewith.

12. The combination with lamps, of yokes therefor having lower attaching means rigidly connected thereto, a transversely extending rock shaft to the ends of which the said attaching means are rigidly fixed, and operating mechanism for the rock shaft and connected to said shaft below the yokes, the operating mechanism being also attached to the rock shaft between the points of connection of the yokes thereto.

In testimony whereof I have hereunto set my hand in presence of two subscribing witnesses.

WILLIAM N. ALLAN.

Witnesses:
 ARMSTEAD N. WEBB,
 JAMES E. STEUART.